United States Patent [19]

Tsukimoto et al.

[11] Patent Number: 5,298,829
[45] Date of Patent: Mar. 29, 1994

[54] VIBRATION WAVE DRIVEN MOTOR

[75] Inventors: Takayuki Tsukimoto, Kawasaki; Takashi Maeno; Hitoshi Mukohjima, both of Yokohama; Hajime Kanazawa, Tama; Shinichi Koreeda; Ichiro Chiba, both of Kawasaki; Akio Atsuta, Yokohama, all of Japan

[73] Assignee: Canon Kabushiki Kaisha, Tokyo, Japan

[21] Appl. No.: 649,902

[22] Filed: Feb. 1, 1991

[30] Foreign Application Priority Data

Feb. 5, 1990 [JP] Japan .................... 2-25732

[51] Int. Cl.⁵ .......................... H01L 41/08
[52] U.S. Cl. .................................. 310/323
[58] Field of Search ........................ 310/323

[56] References Cited

U.S. PATENT DOCUMENTS

| | | | |
|---|---|---|---|
| 4,495,432 | 1/1985 | Katsuma et al. | 310/328 |
| 4,580,073 | 4/1986 | Okumura et al. | 310/323 |
| 4,692,651 | 9/1987 | Hiramatsu et al. | 310/323 |
| 4,752,711 | 6/1988 | Tsukimoto et al. | 310/323 |
| 4,771,203 | 9/1988 | Mukohjima et al. | 310/323 |
| 4,893,047 | 1/1990 | Honda | 310/323 |
| 4,945,275 | 7/1990 | Honda | 310/323 |
| 5,039,899 | 8/1991 | Yamaguchi | 310/323 |
| 5,056,201 | 10/1991 | Kasuga et al. | 310/323 |
| 5,099,167 | 3/1992 | Kimura | 310/323 |
| 5,134,333 | 7/1992 | Atsuta | 310/323 |

FOREIGN PATENT DOCUMENTS

| | | | |
|---|---|---|---|
| 0301430 | 1/1989 | European Pat. Off. | H01L 41/08 |
| 0383309 | 8/1990 | European Pat. Off. | H01L 41/08 |
| 3345274 | 6/1984 | Fed. Rep. of Germany | H01L 41/08 |
| 61-196773 | 8/1986 | Japan | H01L 41/08 |
| 62-160082 | 7/1987 | Japan | H02N 2/00 |
| 0277477 | 11/1988 | Japan | 310/323 |
| 0794685 | 1/1981 | U.S.S.R. | 310/323 |

*Primary Examiner*—Mark O. Budd
*Assistant Examiner*—Thomas M. Dougherty
*Attorney, Agent, or Firm*—Fitzpatrick, Cella, Harper & Scinto

[57] ABSTRACT

In a vibration wave driven motor wherein an AC electric field is applied to an electro-mechanical energy conversion element secured to an elastic member to thereby excite a plurality of standing waves differing in phase from each other in the elastic member and a travelling wave is formed in the elastic member by the combination of the standing waves, whereby a member which is in pressure contact with the elastic member and the elastic member are moved relative to each other by a frictional force, provision is made of means for making the contact pressure on the surface of contact between the elastic member and the member which is in pressure contact with the elastic member non-uniform, and means for making the dynamic rigidity of a vibration member non-uniform in an unnecessary vibration mode created by the means for making the contact pressure non-uniform, whereby the occurrence of noise is prevented by simple and inexpensive means.

17 Claims, 5 Drawing Sheets

VIBRATION WAVE DRIVEN MOTOR

BACKGROUND OF THE INVENTION

1. Field of the Invention

This invention relates to a vibration wave driven motor in which electrical energy is converted into vibration energy by an electro-mechanical energy conversion element and a mechanical output is obtained from the vibration energy through friction.

2. Related Background Art

Generally, a vibration wave driven motor is comprised of a vibration member having an electro-mechanical energy conversion element such as a piezo-electric element secured to an elastic member, and a movable member brought into pressure contact with the elastic member. An AC voltage is applied to the two driving phases of the piezo-electric element to excite a travelling wave in the elastic member and the elastic member and the movable member are moved relative to each other of the vibration energy by the travelling wave through the frictional force with the movable member, and the relative movement is used as the output of the motor. Accordingly, the elastic member is formed of a material of small vibration loss (internal loss) for the purpose of improving the efficiency of the motor, and as the material of the elastic member, use is made of a material of very high Q, e.g. Q=100-300 so that vibration may be readily generated by small energy.

Now, in such a vibration wave driven motor, the movable member is in a state in which it is pressed against the elastic member to take out the output of the motor. Therefore, the elastic member is subjected to a vertical force (a force in the direction of pressure contact) and a frictional force (a moment by a frictional force) during the driving of the motor, and in some cases, vibrations other than the driving wave are also excited due to such forces.

These vibrations are chiefly the natural vibrations of the vibration member (though the vibration member is weakly compounded with the movable member through a frictional force), and provide noise when the frequencies of these vibrations are within an audible range. Also, even if the frequencies of these vibrations themselves are not within the audible range, there will be created the difference thereof from the vibration frequency of the driving mode and a component harmonic wave by the non-linearity of the vibration of the vibration member in a state in which it is combined with the movable member, and if these are within the audible range, they will pose a problem as noise.

I have made motors of various types by way of trial and have studied the vibration mode when the problem of noise arises.

As a result, I have found that there are chiefly two types of noise, one of which is a component harmonic wave of the driving mode created by forced vibration and the other is self-excited vibration created by a frictional force.

It has further been found that the cause of creation of the latter self-excited vibration is divided chiefly into two cases, i.e., a case where it is determined by the dimensions of the movable member and the vibration member, and the dynamic rigidity, friction constant, etc. of the contact portion, and a case where it is caused in a mode one order lower than the driving wave (the out-of-plane mode), irrespective of the dimensions. Further examination of the situation in which the self-excited vibration occurs in the vibration mode one order lower than the driving wave (the out-of-plane mode) has found that the self-excited vibration occurs when the contact between the movable member and the elastic member is not kept uniform.

FIG. 2 of the accompanying drawings shows a typical example of the vibration spectrum at such time. The vibration member used is a circular ring-shaped one. The ordinate represents the output from a sensor layer provided on the vibration member (a sensor layer which produces a voltage conforming to the vibration of the vibration member by the piezo-electric effect, and the abscissa represents frequency.

"f" represents the characteristic in the driving vibration mode (the out-of-plane flexure 7-th-order mode of the circular ring), and "g" represents the characteristic in the vibration mode which has occurred as the self-excited vibration by a frictional force, i.e., the characteristic of the vibration in the mode one order lower than the characteristic "f", i.e., the out-of-plane flexure 6th-order mode. A characteristic "h" is the difference between the characteristic "f" and the characteristic "g", and vibration of about 8 KHz of this characteristic causes noise. Thus, I have confirmed empirically that if there is irregularity of contact (irregularity of pressure) between the elastic member and the movable member, the vibration mode one order lower than the driving wave (i.e., vibration having a number of waves less by one than the number of waves of the driving wave) occurs and any unnecessary vibration mode other than this vibration mode, for example, the vibration mode two orders lower than the vibration mode of the driving wave, does not occur. That is, it has been found that when there is irregularity of contact (irregularity of pressure), the vibration which causes noise is limited to the vibration of the mode one order lower than the driving mode.

Also, examination of the noise when the irregularity of contact (the irregularity of pressure) is small has found that the noise vibration mode changes depending on the structure, materials, friction constants, driving order numbers, etc. of the movable member and elastic member, but in the case of the driving of seven waves, the driving wave is limited to one of three, four, five and six waves or a combination thereof.

FIG. 9 of the accompanying drawings shows a typical example of the noise when the irregularity of pressure is null.

"f" represents the characteristic of the driving vibration mode, "k" represents the characteristic of the 3rd-order vibration mode, and "j" represents the characteristic of the 4th-order vibration mode.

It has been found from what has been described that where there is adopted structure in which no irregularity of pressure occurs, for a case where the driving wave comprises seven waves, a mode free of noise can be realized if a countermeasure for noise is applied to the 3rd-order, 4th-order, 5th-order and 6th-order modes.

On the other hand, it has already been proposed in U.S. application Ser. No. 480,201 filed on Feb. 14, 1990 to provide a portion of non-uniform rigidity in the elastic member or the like as a countermeasure for noise.

The principle of driving of the vibration wave driven motor is that by an AC electric field being applied to the piezo-electric element, two standing waves positionally deviating from each other by π/2, i.e., a standing wave of sin mode and a standing wave of cos mode, are excited in the elastic member and a travelling wave is formed by the combination of the two standing waves, and if a difference occurs between the natural frequencies of the two standing waves, a travelling wave will no longer be formed.

From this, it follows that to prevent the generation of a travelling wave of the unnecessary order number which causes noise, a difference in natural frequency may be provided between two standing waves in that order number.

As a method of providing a difference between the natural frequencies of standing waves, for example in a case where the elastic member is of an annular shape and a plurality of slits are formed at equal pitches in the upper surface thereof along the circumferential direction thereof, the depth of the slit at a location corresponding, for example, to the node of one standing wave but to the antinode in the other standing wave is made greater than the depth of the other slits, whereby it becomes possible to provide a difference between the natural frequencies.

SUMMARY OF THE INVENTION

It is an object of the present invention to provide a vibration wave driven motor which suffers little from the occurrence of noise.

It is another object of the present invention to provide a vibration wave driven motor which is inexpensive and suffers little from the occurrence of noise.

It is still another object of the present invention to forcibly create a mode of an order number one order lower than the order number of the driving mode, to suppress the creation of that mode for such an order number by the action of the above-described portion of non-uniform dynamic rigidity and as a result, to prevent the occurrence of noise.

It is yet still another object of the present invention to provide a vibration wave driven motor including a member for forcibly creating a mode of an order number one order lower than the order number of the driving mode.

According to an embodiment of the present invention, a vibration wave driven motor in which an AC electric field is applied to an electro-mechanical energy conversion element secured to an elastic member to thereby excite a plurality of standing waves differing in phase from each other in the elastic member and a travelling wave is formed in the elastic member by the combination of the standing waves, whereby a member which is in pressure contact with the elastic member and the elastic member are moved relative to each other by frictional force is characterized by the provision of means for making the contact pressure on the surface of contact between the elastic member and the member which is in pressure contact with the elastic member non-uniform, and means for making the dynamic rigidity of a vibration member non-uniform in an unnecessary vibration mode created by the means for making the contact pressure non-uniform, whereby the occurrence of noise is prevented by simple and inexpensive means.

Other objects of the present invention will become apparent from the following detailed description of the invention.

DESCRIPTION OF THE PREFERRED EMBODIMENTS

Embodiment 1

Figure 1:
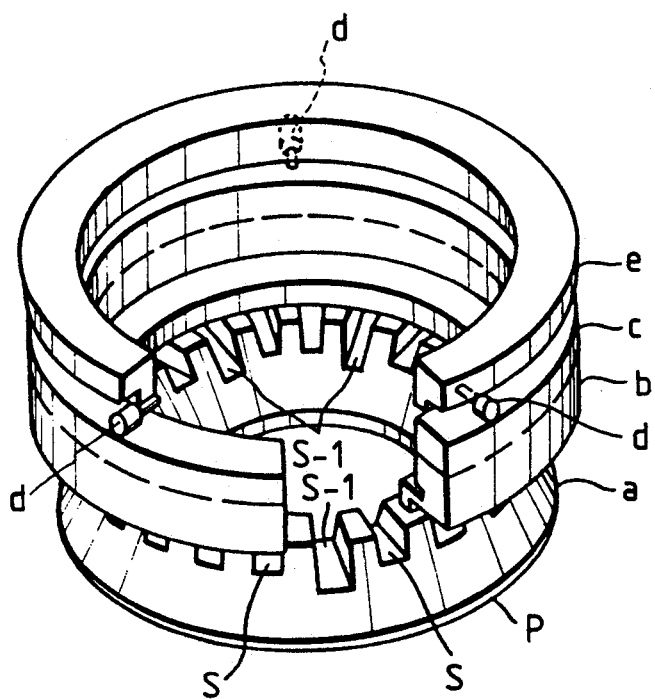
FIG. 1 is a partly cut-away perspective view showing Embodiment 1 of a vibration wave driven motor according to the present invention.
Figure 2:
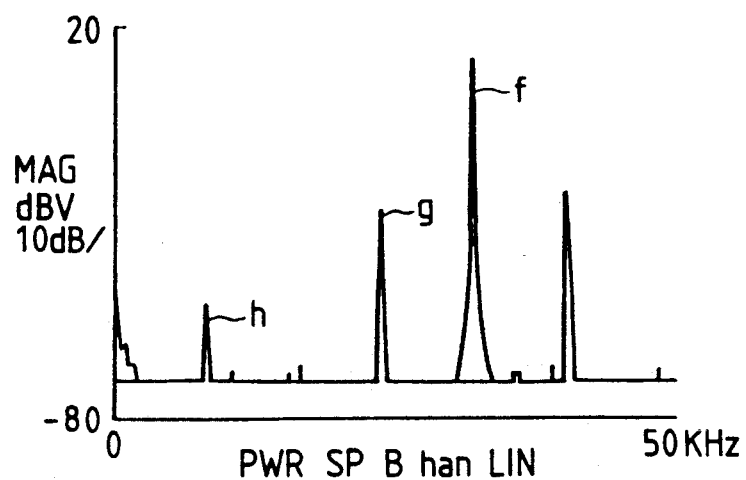
FIG. 2 is a graph showing a vibration spectrum.

FIG. 1 is a partly cut-away perspective view showing Embodiment 1 of a vibration wave driven motor according to the present invention. In this embodiment, driving is effected when the driving wave comprises seven waves, that is, driving in the 7th-order driving mode.

In FIG. 1, the reference character a designates an elastic member formed into a circular ring-like shape and having a piezo-electric element P as an electro-mechanical energy conversion element adhesively secured to the back thereof. A number of slits S are formed at equal pitches in the upper surface of the elastic member a, and among these slits S, several (in the present embodiment, six) slits S-1 are formed more deeply than the other slits, and a portion of non-uniform dynamic rigidity is provided by these slits S-1 as previously described, whereby the generation of a travelling wave of six waves (6th-order) smaller by one than the number of waves for driving may be hampered.

That is, even in a situation wherein there is generated a travelling wave of six waves which is the cause of noise which is the only unnecessary vibration caused by the pressure between a vibration member and a movable member being made non-uniform, the generation of such travelling wave of six waves is hampered by these slits S-1.

The reference character b denotes an annular movable member, and the reference character c designates rubber. A plurality of rollers d are disposed on the upper surface of the rubber c, and a pressing structure e is disposed on these rollers d. When such structure is adopted and an electrical signal is supplied to the piezoelectric element P, a travelling wave is formed in a conventional manner. The movable member b frictionally driven by this travelling wave is rotated and it is possible to accelerate and decelerate the motor through the intermediary of the rollers d. Also, by the rollers d, three portions in which surface pressure is high are forcibly created on the contact driving surface between the elastic member a and the movable member b.

Thus, due to the non-uniformity of this surface pressure forcibly created, there is generated the 6th-order mode one order lower than the driving mode (the 7th-order driving mode), that is, there is generated a travelling wave of six waves, but the generation of the travelling wave of six waves is hampered by the action of the portion of non-uniform rigidity provided by the six slits S-1 which is associated with the 6th-order vibration mode, with a result that the occurrence of noise is suppressed.

Figure 3:
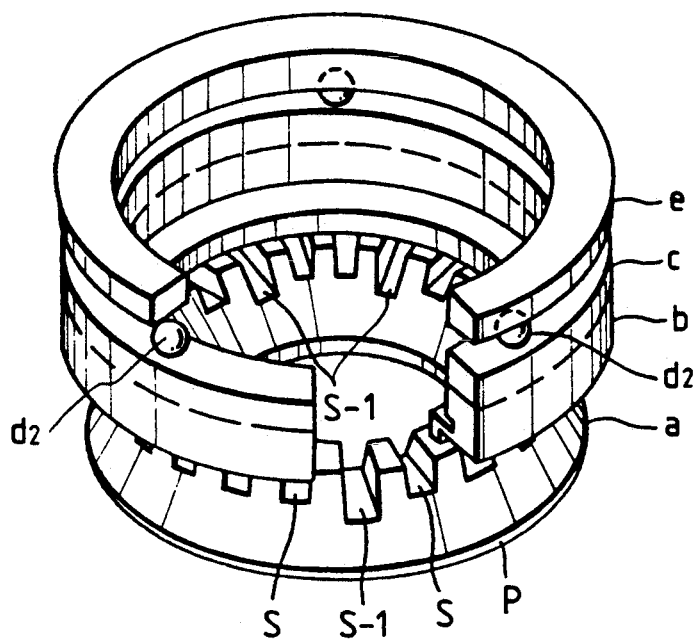
FIG. 3 is a perspective view showing a modification of Embodiment 1.

As shown in FIG. 3, balls $d_2$ may be used instead of the rollers d to obtain a similar effect. By threading a shaft through each ball $d_2$, the output can be taken out. Also, the output of the motor may be directly transmitted from the movable member b to a load, for example, the photo-taking lens driving mechanism of a camera.

Embodiment 2

Figure 4:
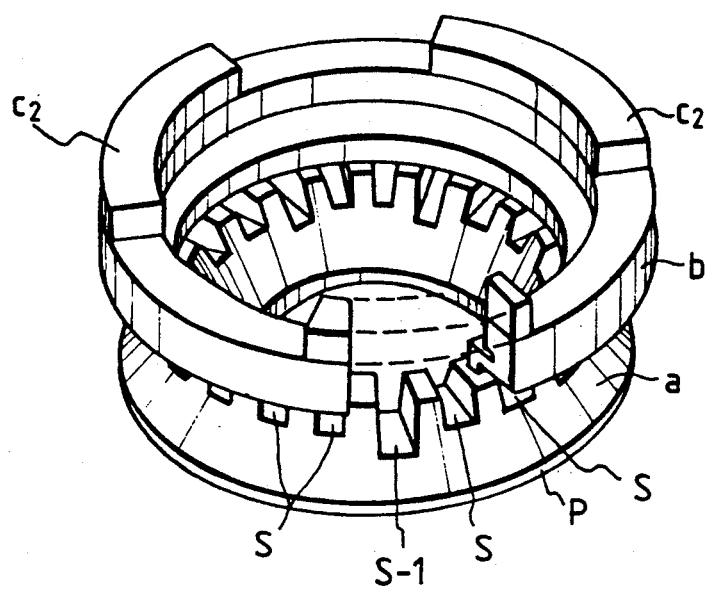
FIG. 4 is a partly cut-away perspective view of Embodiment 2.

FIG. 4 shows Embodiment 2.

In this embodiment, as in Embodiment 1, the creation of the unnecessary vibration mode of six waves is hampered by the action of six slits S-1 formed in the elastic member a. Also, the non-uniformity of the surface pressure is created by divisionally disposing rubber $c_2$. Embodiment 3.

Figure 5:
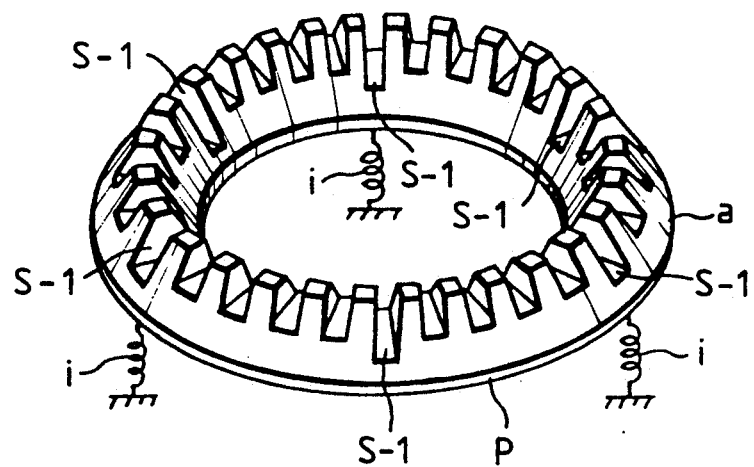
FIG. 5 is a perspective view of Embodiment 3.

FIG. 5 shows Embodiment 3.

In this embodiment, the elastic member a designed to hamper the creation of the unnecessary vibration mode by the action of slits S-1 formed in the elastic member a is held by coil springs i disposed at three locations, whereby irregularity of pressure is created.

EMBODIMENT 4

Figure 6:
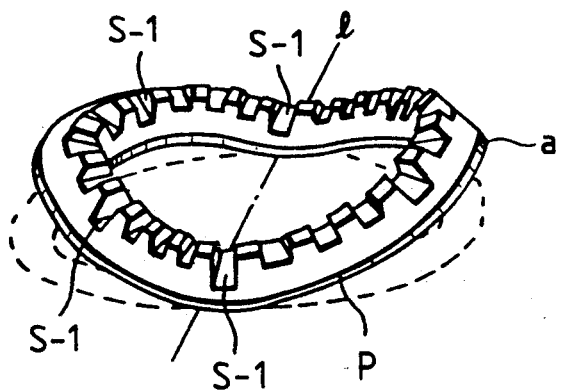
FIG. 6 is a perspective view of Embodiment 4.

FIG. 6 shows Embodiment 4.

In this embodiment, the elastic member a shown in FIG. 1 is deformed into a twofold state about the axis 1 thereof to thereby create irregularity of pressure. If the amount of this fold is of the order of several $\mu m$ (the order of the vibration amplitude of the driving mode), there may be caused noise by irregularity of pressure.

The elastic member d may be deformed into a threefold or fourfold state to thereby create irregularity of pressure likewise.

Embodiment 5

Figure 7:
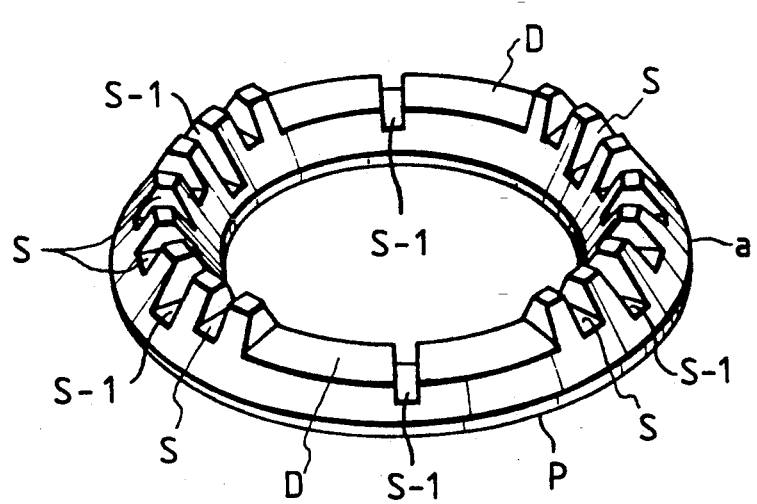
FIG. 7 is a perspective view of Embodiment 5.

FIG. 7 shows Embodiment 5.

In this embodiment, as shown, two of the slits S formed in the elastic member are partly thinned out in the circumferential direction thereof (see D) and the pitches of the slits S are made unequal to thereby create irregularity of pressure, and as in the above-described embodiments, slits S-1 for suppressing the occurrence of the unnecessary vibration mode (the vibration mode one order lower than the driving mode) by the portion of non-uniform dynamic rigidity are formed in the elastic member a.

Embodiment 6

Figure 8:
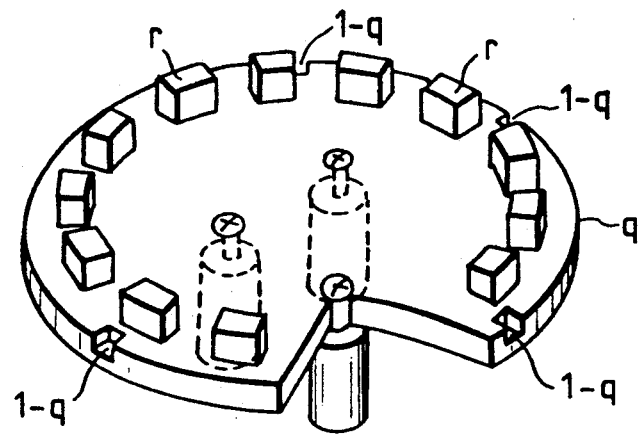
FIG. 8 is a partly cut-away perspective view of Embodiment 6.
Figure 9:
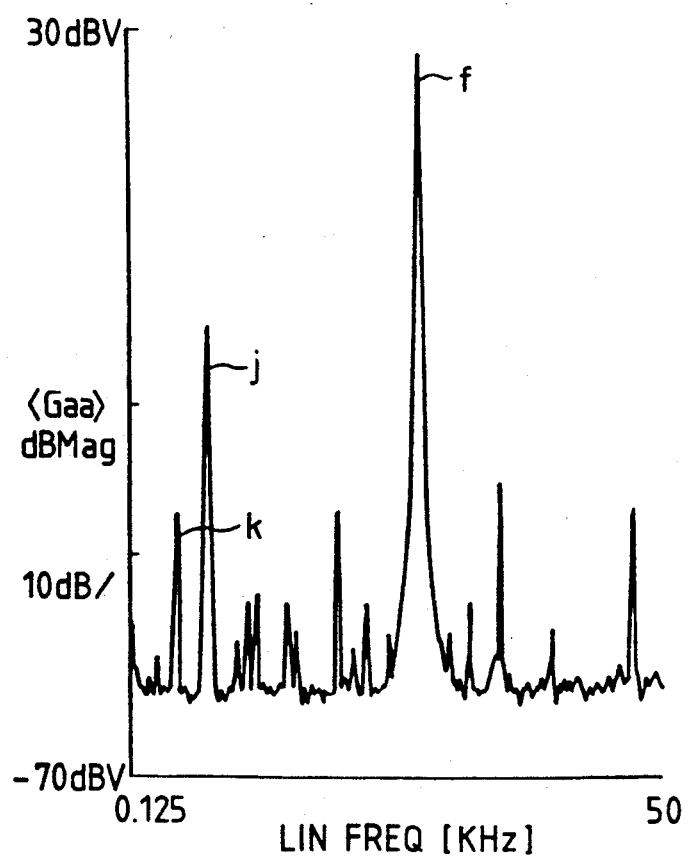
FIG. 9 is a graph showing a vibration spectrum.

FIG. 8 shows Embodiment 6.

In this embodiment, irregularity of pressure is created by the surface deformation of a vibration member caused by a plurality of support members r disposed on a fixing member q to which the vibration member is fixed, and portions of non-uniform dynamic rigidity are provided by cut-away portions 1-q formed at equal pitches at six locations on the circumference of the fixing member q, thereby providing a countermeasure for preventing noise.

The mechanism or structure for creating irregularity of pressure in each of the above-described embodiments may often be given birth due to such factors as manufacturing cost, etc. in the actual mounting of the motor, and the structures of the respective embodiments can also be combined together.

Also, only the method of making the grooves (slits) deep has been shown as means for providing the portions of non-uniform dynamic rigidity at a pitch integer times as great as the $\frac{1}{2}$ wavelength of the vibration mode one order lower than the driving vibration mode, but conversely, the above-described various kinds of pressure irregularity creating means can also be constructed by making the grooves (slits) shallow or by adding a mass, whereby an effect similar to that described above can be obtained.

As has hitherto been described, according to the present invention, a vibration mode which is one order lower than the driving vibration mode and in which noise can occur is forcibly created by the means for making the contact pressure between the vibration member and the movable member nonuniform, whereby the occurrence of any unnecessary vibration mode other than that vibration mode, i.e., a vibration mode still lower than the aforementioned one-order lower vibration mode, is eliminated. The occurrence of the afore-described forcibly created unnecessary vibration mode can be prevented by other means, i.e., means for making the dynamic rigidity non-uniform, with a result that the occurrence of noise can be prevented.

The present invention is also applicable to a motor in which, conversely to the above-described embodiments, a vibration member comprising an elastic member and a piezo-electric element is movable and a movable member side element which is the other constituent is fixed.

What is claimed is:

1. A vibration wave driven motor comprising:
   (a) a vibration member having a contact surface, said vibration member generating a travelling vibration wave therein in response to an applied electrical signal;
   (b) a contact member having a contact surface which is in contact with the contact surface of said vibration member and arranged to receive the travelling vibration wave from the contact surface of said vibration member, whereby the travelling vibration wave creates relative movement between the vibration member and the contact member;
   (c) means for making a contact pressure between the contact surface of said vibration member and the contact surface of said contact member non-uniform; and
   (d) means for making the dynamic rigidity of the vibration member non-uniform, said means being provided so as to hamper an unnecessary vibration mode created in the vibration member by said means when the electrical signal is applied to the vibration member.

2. A vibration wave driven motor according to claim 1, wherein said means for making the dynamic rigidity non-uniform is provided on the vibration member at a pitch approximately equal to an integer number of the half wavelength of said unnecessary vibration mode.

3. A vibration wave driven motor according to claim 1, wherein said non-uniform contact pressure applying means includes a member for generating pressure between the contact surface of said vibration member and the contact surface of said contact member, and a member for making the pressure force generated by said member for generating pressure non-uniform.

4. A vibration wave driven motor according to claim 3, wherein said non-uniform pressure force applying member is interposed between said pressure applying member and said contact member.

5. A vibration wave driven motor according to claim 4, wherein said non-uniform pressure force applying member includes rollers.

6. A vibration wave driven motor according to claim 4, wherein said non-uniform pressure force applying member has a plurality of balls.

7. A vibration wave driven motor comprising:
 (a) a vibration member having a contact surface, said vibration member generating a travelling vibration wave therein in response to an applied electrical signal;
 (b) a contact member having a contact surface which is in contact with the contact surface of said vibration member and arranged to receive the travelling vibration wave from the contact surface of said vibration member, whereby the travelling vibration wave creates relative movement between the vibration member and the contact member;
 (c) means for making a contact pressure between the contact surface of said vibration member and the contact surface of said contact member non-uniform; and
 (d) means for making the dynamic rigidity of the vibration member non-uniform, said means being provided so as to hamper an unnecessary vibration mode created in the vibration member by said means when the electrical signal is applied to the vibration member,
wherein said non-uniform contact pressure applying means includes a weighting member provided only on a portion of said contact member.

8. A vibration wave driven motor according to claim 7, wherein said weighting member includes a plurality of divided pieces.

9. A vibration wave driven motor according to claim 8, wherein said pieces are rubber pieces.

10. A vibration wave driven motor comprising:
 (a) a vibration member having a contact surface, said vibration member generating a travelling vibration wave therein in response to an applied electrical signal;
 (b) a contact member having a contact surface which is in contact with the contact surface of said vibration member and arranged to receive the travelling vibration wave from the contact surface of said vibration member, whereby the travelling vibration wave creates relative movement between the vibration member and the contact member;
 (c) means for making a contact pressure between the contact surface of said vibration member and the contact surface of said contact member non-uniform; and
 (d) means for making the dynamic rigidity of the vibration member non-uniform, said means being provided so as to hamper an unnecessary vibration mode created in the vibration member by said means when the electrical signal is applied to the vibration member,
wherein said non-uniform contact pressure applying means includes springs provided at a plurality of locations on said vibration member.

11. A vibration wave driven motor comprising:
 (a) a vibration member having a contact surface, said vibration member generating a travelling vibration wave therein in response to an applied electrical signal;
 (b) a contact member having a contact surface which is in contact with the contact surface of said vibration member and arranged to receive the travelling vibration wave from the contact surface of said vibration member, whereby the travelling vibration wave creates relative movement between the vibration member and the contact member;
 (c) means for making a contact pressure between the contact surface of said vibration member and the contact surface of said contact member non-uniform; and
 (d) means for making the dynamic rigidity of the vibration member non-uniform, said means being provided so as to hamper an unnecessary vibration mode created in the vibration member by said means when the electrical signal is applied to the vibration member,
wherein said non-uniform contact pressure applying means includes a member for keeping said vibration member curved.

12. A vibration wave driven motor comprising:
 (a) a vibration member having projections formed by grooves provided at unequal pitches, said vibration member generating a travelling wave therein in response to an applied electrical signal;
 (b) a movable member having a contact surface which is in contact with the projections of said vibration member and arranged to receive the travelling vibration wave from the projections of said vibration member, whereby the travelling wave creates relative movement between the vibration member and the movable member;
 (c) means for making a contact pressure between the contact surface of said vibration member and the contact surface of said contact member non-uniform; and
 (d) means for making the dynamic rigidity of the vibration member non-uniform, said means being provided so as to suppress an unnecessary vibration made that may be created in the vibration member by said means when an electrical signal is applied to the vibration means.

13. A vibration wave driven apparatus comprising:
 (a) a vibration member having a contact surface, said vibration member generating a travelling vibration wave having a predetermined wave number therein in response to an applied electrical signal;
 (b) a contact member having a contact surface which is in contact with the contact surface of said vibration member and arranged to receive the travelling vibration wave from the contact surface of said vibration member, whereby the travelling vibration wave creates relative movement between the vibration member and the contact member;
 (c) means for making a contact pressure between the contact surface of said vibration member and the contact surface of said contact member non-uniform; and
 (d) means for making the dynamic rigidity of the vibration member non-uniform, said means being provided so as to preclude a vibration wave of a wave number one wave less than predetermined wave number which is attributable to said means from being generated in said vibration member when an electrical signal is applied to the vibration member.

14. A vibration wave driven motor comprising:

(a) a vibration member having a contact surface, said vibration member generating a vibration wave predetermined wave number therein in response to an applied electrical signal;
(b) a contact member having a contact surface which is in contact with the contact surface of said vibration member and arranged to receive the vibration wave from the contact surface of said vibration member, whereby the vibration wave creates relative movement between the vibration member and the contact member;
(c) means for making a contact pressure between the contact surface of said vibration member and the contact surface of said contact member non-uniform; and
(d) means for making the dynamic rigidity of the vibration member non-uniform, said means being provided so as to preclude a vibration wave of a wave number one wave less than said predetermined wave number which is attributable to said means from being generated when an electrical signal is applied to the vibration member.

15. A vibration wave driven motor comprising:
(a) a vibration member having a contact surface, said vibration member generating a vibration wave having a predetermined wave number in response to an applied signal;
(b) means for making a contact pressure between the contact surface of said vibration member and the contact surface of a contact member which is in contact with the contact surface of said vibration member non-uniform; and
(c) means for making the dynamic rigidity of the vibration member non-uniform, said means being provided so as to preclude a vibration wave of a wave number one wave less than said predetermined wave number which is attributable to said means for being generated in said vibration member when the signal is applied to the vibration member.

16. A vibration wave driven motor comprising:
(a) a vibration member having a contact surface, said vibration member generating a vibration wave having a predetermined wave number in response to an applied electrical signal;
(b) a contact member having a contact surface which is in contact with the contact surface of said vibration member and arranged to receive the vibration wave from the contact surface of said vibration member, whereby the vibration wave creates relative movement between the vibration member and the contact member; and
(c) means for making a contact pressure between the contact surface of said vibration member and the contact surface of said contact member non-uniform.

17. A vibration wave driven motor comprising:
(a) a vibration member having a contact surface, said vibration member generating a vibration wave having a predetermined wave number in response to an applied electrical signal; and
(b) means for making a contact pressure between the contact surface of said vibration member and the contact surface of a contact member which is in contact with the contact surface of said vibration member non-uniform.

* * * * *

UNITED STATES PATENT AND TRADEMARK OFFICE
CERTIFICATE OF CORRECTION

PATENT NO. : 5,298,829

DATED : March 29, 1994

INVENTOR(S) : TSUKIMOTO ET AL.

Page 1 of 2

It is certified that error appears in the above-indentified patent and that said Letters Patent is hereby corrected as shown below:

Column 1

Line 21, change "of" to --by--; and change "by" to --of--.
    Line 53, change "I" to --We--.
    Line 56, change "I" to --we--.

Column 2

Line 16, change "7-th-order" to --7th-order--.
    Line 25, change "I" to --we--.

Column 3

Line 35, change "to" to --and to--.

Column 5

Line 17, delete "Em-".
    Line 18, change "bodiment 3." to --¶ Embodiment 3--.
    Line 26, change "EMBODIMENT 4" to --Embodiment 4--.
    Line 34, change "member d" to --member a--.

UNITED STATES PATENT AND TRADEMARK OFFICE
CERTIFICATE OF CORRECTION

PATENT NO. : 5,298,829

DATED : March 29, 1994

INVENTOR(S) : TSUKIMOTO ET AL.

It is certified that error appears in the above-indentified patent and that said Letters Patent is hereby corrected as shown below:

<u>Column 5</u>

Line 41, change "member" to --member a--.

Signed and Sealed this

Twentieth Day of September, 1994

Attest:

BRUCE LEHMAN

Attesting Officer     Commissioner of Patents and Trademarks